US005918230A

United States Patent [19]

Becker et al.

[11] Patent Number: 5,918,230

[45] Date of Patent: Jun. 29, 1999

[54] METHOD FOR OPERATING A MEMORY CARD

[75] Inventors: Klaus Becker; Jörg Neumann, both of Berlin, Germany

[73] Assignee: Siemens Nixdorf Informationssysteme Aktientgesellschaft, Paderborn, Germany

[21] Appl. No.: 08/809,573

[22] PCT Filed: Sep. 7, 1995

[86] PCT No.: PCT/DE95/01222

§ 371 Date: Mar. 26, 1997

§ 102(e) Date: Mar. 26, 1997

[87] PCT Pub. No.: WO96/11447

PCT Pub. Date: Apr. 18, 1996

[30] Foreign Application Priority Data

Oct. 7, 1994 [DE] Germany ............................ 44 35 902

[51] Int. Cl.$^{6}$ ...................................................... G06F 17/30

[52] U.S. Cl. ............................................................. 707/101

[58] Field of Search ......................... 707/1–10, 100–104, 707/200–206; 345/326, 327; 395/200.3, 200.31–200.39

[56] References Cited

U.S. PATENT DOCUMENTS

| | | | |
|---|---|---|---|
| 4,935,870 | 6/1990 | Burk, Jr. et al. | 395/200.33 |
| 5,546,575 | 8/1996 | Potter et al. | 707/101 |
| 5,703,795 | 12/1997 | Mankovitz | 345/327 |
| 5,778,371 | 7/1998 | Fujihara | 707/100 |

FOREIGN PATENT DOCUMENTS

| | | |
|---|---|---|
| WO 87/05420 | 9/1987 | WIPO . |
| WO 87/07060 | 11/1987 | WIPO . |
| WO 88/01818 | 3/1988 | WIPO . |

OTHER PUBLICATIONS

ISO/IEC 7816–4: 1993 (E), Information technology—Identification cards—Integrated circuit cards with contacts—Part 4: Inter–industry commands for interchange, pp. 1–41.

*Primary Examiner*—Ruay Lian Ho
*Attorney, Agent, or Firm*—Hill & Simpson

[57] ABSTRACT

The method is for non-erasable or non-alterable storage of data records in a device, initialization establishing the format of the data records and determining those data fields by way of which summation is permissible. An initialization character sequence is transmitted that has at least a number and length of the data fields to be stored. The valid initialization character sequence is accepted and executed only once. After acceptance only data records whose coding satisfies the information is accepted.

5 Claims, No Drawings

METHOD FOR OPERATING A MEMORY CARD

BACKGROUND OF THE INVENTION

The invention relates to a device for the permanent storage of formatted data.

Permanent storage of data is necessary in many areas of automatic data processing. They are, for example, sales in cash desks or diagnostic data in electronic devices. It is intended here to protect the stored data against erroneous erasure and intentional manipulation. A paper strip having the data printed on it has been used for this purpose to date.

It is desirable to use electronic memories instead of paper strips in order, in this way, to save space, to be able to further process the data automatically and to achieve a higher level of protection against falsification.

International Reference WO 87/07060 describes a memory card whose memory is subdivided by means of initialization into a number of data records of fixed length and which has a protection mechanism by means of different PINs.

SUMMARY OF THE INVENTION

The object of the invention is to specify such a memory, which can be employed flexibly.

The invention makes use of memory cards with processing power. In this case, the format of the data to be stored and the type of evaluation are established in an initialization phase. Afterwards, only data in this format can be stored.

DESCRIPTION OF THE PREFERRED EMBODIMENTS

The memory card used is a combination of an electronic memory with a processor and an input/output unit of the kind present, for example, in the SL44C40 memory card from Siemens. The input/output interface is in this case operated according to ISO Standard 7816. If a larger storage capacity is required, such a device can also be constructed from components on printed circuit boards and subsequently be encapsulated in order to preclude electrical manipulation of the memory contents. For the sake of simplicity, all of these variants are referred to as memory card in the following text.

In order to use such an arrangement as a memory device, a read-only memory in the memory card is equipped with a program. The data which is to be stored in the EEPROM, and the form in which it is to be stored in the EEPROM, is established beforehand. Also established are a transfer format and method at the interface. The program which satisfies these specifications is created and written to the read-only memory by means of a programming device. Afterwards, the memory card can be used for the intended purpose. If the format of the data to be stored changes, then a new read-only memory content is determined and programmed into new cards. The memory cards are provisioned separately for each application. If the content to be stored changes, for example, on account of legal prescriptions, then it is necessary to destroy memory cards which are not used up. Comprehensive provisioning is also necessary in the case of a multiplicity of different memory formats.

Therefore, a fixed program which is common to all the variants is used in accordance with the invention, which program determines the format and the form of the data to be stored by means of an initialization dialog.

The communication between the memory card and a device using it, for example a cash register, takes place via a communications protocol, predominantly according to ISO 7816. A simplified illustration is used below for the purpose of better comprehensibility. In this case, character sequences are transmitted. A format may be selected in which the first character contains the number of data characters, the second character is a type identifier for the data record and the following data characters depend on the type of data record. The format therefore:

| Start | Number | Type | Data | Stop |
|---|---|---|---|---|
| AA | n | 1 = Init<br>2 = Ident<br>3 = Data<br>4 = Read | n characters of data | 55 |

For an Init data record, each data character defines a data field and is coded as follows:

| Bit | Meaning |
|---|---|
| 7 | 1 = Capable of summation |
| 6 | 1 = BCD-coded |
| 5..0 | Number of characters |

As a result, a character sequence

| |
|---|
| AA 04 01 01 C5 82 43 55 |

represented in the hexadecimal system would have the effect that this message of type 1 is an initialization instruction which defines the format of subsequent data records on four fields as follows:

1. one character, which is merely stored,
2. five characters, which are checked for BCD coding, that is to say permit numbers having a maximum of 10 digits, and are accessible to summation,
3. two characters, which are binary coded and therefore permit numbers between 0 and 65767 and are accessible to summation,
4. three characters, which store six digits in a BCD-coded manner, for example an item of data which is not taken into account during summation.

Afterwards a message of type 2 is used to set a BCD-coded serial number "54321":

| |
|---|
| AA 03 02 05 43 21 AA |

Now, for example, the three data records

| |
|---|
| AA 0B 03 58 00 00 01 00 35 00 05 94 06 12 55 |
| AA 0B 03 58 00 00 00 88 97 00 07 94 06 12 55 |
| AA 0B 03 58 00 00 02 00 53 00 10 94 06 13 55 |

are communicated, accepted and stored.

The following would be rejected

| |
|---|
| AA 08 03 58 00 00 01 00 35 00 05 55 |
| (incorrect field number) |
| AA 0B 03 58 00 00 00 C8 97 00 07 94 06 12 55 |
| (second field not BCD-coded) |
| AA 0B 03 58 00 00 02 00 53 00 10 C4 06 13 55 |
| (fourth field not BCD-coded) |

An enquiry with summation by way of the first three fields would yield:

| |
|---|
| AA 07 05 43 21 00 00 03 89 85 00 1C 55 |

in other words, first of all the serial number, then the sum by way of the second fields in BCD representation and then the sum by way of the third fields in binary representation.

The individual data records are made accessible by other interrogations.

Let us assume that the memory comprises 65768 bytes. The first 32 bytes are then used for management. In this case, the field division is split up in accordance with the first data record and the serial number. Since each data record to be stored requires 11 bytes, the remainder of 65768−32=65736 is divided by 11 and produces a number of 5976 data records. If a write once only memory is involved, an additional byte would have to be used as marking "written", therefore producing a record length of 12 bytes and hence a total number of 5478 records.

The invention is particularly suitable for storing financial data in cash desks, for example storing daily sums in cash desk systems, in the case of which tamperproof storage is required by legal prescriptions.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for operating a memory card which contains a processor, an interface and a non-volatile memory and in which data in the form of data records are accepted from the processor via the interface and are stored in the non-volatile memory, comprising the steps of:

transmitting an initialization character sequence via the interface, the sequence containing at least a number and length of the data fields to be stored;

accepting and executing only once a valid initialization character sequence;

providing an initialization character sequence containing at least information regarding coding of data fields to be stored;

once a valid initialization character sequence has been accepted, accepting only data records whose coding satisfies the information, contained in the initialization character sequence regarding the coding of the fields, it is possible only to add data records, but not to alter or erase any data records.

2. The operating method as claimed in claim 1, wherein, following storage at least of a first data record, a further character sequence causes the memory device to combine data fields of different data records by using a function which is coded in the further character sequence, and to send back a result thereof.

3. The operating method as claimed in claim 2, wherein the further character sequence causes the memory device to add data fields of different data records.

4. The operating method as claimed in claim 1, wherein each character of the initialization character sequence determines a data field, which has a bit field having a type identifier for the data field and a bit field for the length of the data field, and wherein the type identifier contains at least one indicator which indicates whether the data field is suitable for summation and, optionally, also contains an indicator as to whether the data are communicated in a binary format or as packed decimal digits.

5. The operating method as claimed in claim 1, wherein, before storage of a first data record, an additional character sequence is communicated to the memory device, which contains a character sequence which is stored on the memory card and can no longer be altered after storage of the first data record, by which unambiguous identification of the individual exemplar of the card is achieved by subsequent read-out.

* * * * *